(12) United States Patent
Cao et al.

(10) Patent No.: US 11,656,637 B2
(45) Date of Patent: May 23, 2023

(54) COOPERATIVE PATH PLANNING METHOD AND DEVICE FOR AUTOMATIC CONTROL AEROCRAFT AND AEROCRAFT SYSTEM

(71) Applicant: Beihang University, Beijing (CN)

(72) Inventors: Xianbin Cao, Beijing (CN); Wenbo Du, Beijing (CN); Liang Xu, Beijing (CN)

(73) Assignee: Beihang University, Beijing (CN)

( * ) Notice: Subject to any disclaimer, the term of this patent is extended or adjusted under 35 U.S.C. 154(b) by 161 days.

(21) Appl. No.: 17/102,950

(22) Filed: Nov. 24, 2020

(65) Prior Publication Data

US 2021/0294357 A1    Sep. 23, 2021

(30) Foreign Application Priority Data

Mar. 19, 2020    (CN) ............................ 202010195554

(51) Int. Cl.
   *G05D 1/10*    (2006.01)
   *G01C 21/20*    (2006.01)
   *G08G 5/04*    (2006.01)
   *G08G 5/00*    (2006.01)

(52) U.S. Cl.
   CPC ............. *G05D 1/106* (2019.05); *G01C 21/20* (2013.01); *G08G 5/0039* (2013.01); *G08G 5/045* (2013.01)

(58) Field of Classification Search
   CPC ...... G05D 1/106; G01C 21/20; G08G 5/0039; G08G 5/045
   See application file for complete search history.

(56) References Cited

U.S. PATENT DOCUMENTS 10,347,139 B2 *   7/2019   Kohn-Rich ............ G05D 1/102

FOREIGN PATENT DOCUMENTS

CN    106125760 A    11/2016
CN    110595493 A    12/2019

OTHER PUBLICATIONS

Zhang et al., Robot path planning in uncertain environment using multi-objective particle swarm optimization, 2012, School of Information and Electronic Engineering, China University of Mining and Technology, pp. 173-176 (Year: 2012).*
Shengliang, Fang,"Route Planning For Unmanned Aerial Vehicles Based On Particle Swarm Optimization", Aug. 31, 2010, p. 41-43, vol. 27—No. 8, Computer Simulation (English Abstract).

* cited by examiner

*Primary Examiner* — Anne Marie Antonucci
*Assistant Examiner* — Jared C Bean
(74) *Attorney, Agent, or Firm* — Calfee Halter & Griswold LLP

(57) ABSTRACT

This disclosure provides a cooperative path planning method and device for automatic control aerocraft and aerocraft system. The method includes: determining the current evaluation index of each selected point according to its current position, the target position of the aerocraft and the position of obstacles in the selected area; updating the adjustment displacement of each selected point according to its adjustment displacement, current position and historical optimal position, as well as the global optimal position; updating the current position of each selected point according to its current position and the updated adjustment displacement; after the current position is updated for a set number of times, selecting the position corresponding to the optimal evaluation index from the current positions and global optimal position of all selected points as the next waypoint of the aerocraft.

16 Claims, 4 Drawing Sheets

COOPERATIVE PATH PLANNING METHOD AND DEVICE FOR AUTOMATIC CONTROL AEROCRAFT AND AEROCRAFT SYSTEM

CROSS-REFERENCE TO RELATED APPLICATIONS

This application claims priority to Chinese Patent Application No. 202010195554.7, filed on Mar. 19, 2020, which is hereby incorporated by reference in its entirety.

TECHNICAL FIELD

This disclosure involves the technical field of the aerocraft. In particular, it involves a cooperative path planning method and device for automatic control aerocraft and aerocraft system.

BACKGROUND

Because of the advantages of convenient use, low cost and so on, automatic control aerocraft (hereinafter referred to as aerocraft) has been widely used in both military and civil fields. In order to meet the needs of special application, there are already control technologies of autopilot in the field of aerocraft automatic control. However, at present, the automatic control technology of aerocraft mostly uses the way of constructing smooth curves and so on to plan the path of aerocraft; while a path planning of constructing smooth curve method, in order to reasonably avoid obstacles and ensure the smoothness of the path, the path planning may not be better.

SUMMARY

This disclosure provides a cooperative path planning method and device for automatic control aerocraft, which can realize better selection of aerocraft waypoints.

On the one hand, this disclosure provides a cooperative path planning method for automatic control aerocraft, including:

step S101: in the selected area, initializing randomly the current position and the adjustment displacement of each selected point;

step S102: determining the current evaluation index of each selected point according to the current position of each selected point, the target position of the aerocraft and the position of the obstacles in the selected area;

step S103: updating the adjustment displacement of each selected point according to its adjustment displacement, current position, historical optimal position and global optimal position; determining the historical optimal position of each selected point according to the current evaluation index and the optimal evaluation index corresponding to its historical position; the global optimal position is the position with the best evaluation index among the historical optimal positions of all selected points;

step S104: calculating the temporary position according to the current position of each selected point and its updated adjustment displacement, and updating the current position of each selected point with its temporary position when the temporary position is located in the selected area;

after repeating the steps S102-S104 for setting times, determining the current evaluation index corresponding to each selected point again according to the current position of each selected point, the target position of the aerocraft and the position of the obstacles in the selected area, and then executing step S105;

step S105: selecting the position corresponding to the optimal evaluation index among the current positions of all the selected points and the global optimal position as the next waypoint of the aerocraft.

Alternatively, the step S103 includes:

calculating the self-learning displacement according to the self-learning probability, current position and historical optimal position of each selected point;

calculating the global learning displacement according to the global learning probability, current position and global optimal position of each selected point;

updating the adjustment displacement of each selected point according to its adjustment displacement, self-learning displacement and global learning displacement;

wherein the sum of the self-learning probability and the global learning probability of each selected point is 1.

Alternatively, when the adjustment displacement is the first update, the self-learning probability is initialized randomly;

When the adjustment displacement is not the first update, the steps of obtaining the self-learning probability include:

Another selected point is selected randomly;

When the evaluation index corresponding to the historical optimal position of the other selected point is less than or equal to the evaluation index corresponding to the historical optimal position of the selected point, the self-learning probability of the selected point is kept unchanged;

When the evaluation index corresponding to the historical optimal position of the other selected point is larger than the evaluation index corresponding to the historical optimal position of the selected point, the self-learning probability corresponding to the selected point is updated according to the learning coefficient, the self-learning probability of the other selected point and the self-learning probability of the selected point.

Alternatively, updating the self-learning probability of each selected point according to its learning coefficient, the self-learning probability of the other selected point and the self-learning probability of each selected point including:

calculating the probability difference between the self-learning probability of the other selected point and the self-learning probability of each selected point;

calculating the probability adjustment value according to the probability difference and the learning coefficient, and updating the self-learning probability corresponding to each selected point according to its self-learning probability and the probability adjustment value.

Alternatively, the steps for determining the selected area include:

determining the obstacle area within the sphere area or the parts of sphere area with the aerocraft position as the sphere center and the first length as the radius, and determining the projected area of the obstacle area on the spherical surface or the spherical crown surface corresponding to the parts of sphere;

determining the set length according to the projected area and the first length;

setting the sphere range or parts of sphere range with the aerocraft position as the sphere center and the set length as the radius as the selected area.

Alternatively, the steps of determining the selected area include:

when the position deviation of multiple waypoints continuously passed by the aerocraft is less than the set deviation, the sphere range or parts of sphere range determined by taking the aerocraft position as the center and the third length as the radius is excluded from the selected area;

the third length is less than the set length.

Alternatively, determining the current evaluation index corresponding to each selected point according to the current position of each selected point, the target position of the aerocraft and the position of the obstacles in the selected area including, calculating the first distance from the aerocraft position to each selected point, the second distance from the aerocraft position to the target position, and the third distance from each selected point to the target position;

calculating the distance index of each selected point according to its first distance, the second distance and the third distance; and determining the straight line path according to the position of the aerocraft and each selected point;

calculating the collision index according to the straight path and the position of the obstacles;

calculating the evaluation index according to the distance index and the collision index.

Alternatively, the obstacles include fixed obstacles and moving obstacles;

Calculating the collision index according to the straight path and the position of the obstacles includes:

calculating the static collision index according to the points on the straight path and the position of each fixed obstacle; and/or, calculating the corresponding interval distance according to the points on the straight line path and the position of each moving obstacle;

calculating the dynamic collision index according to each interval distance and safety distance;

calculating the collision index according to the static collision index and the dynamic collision index.

Alternatively, calculating the collision index according to the straight path and the position of obstacle including:

calculating the corresponding interval distance according to the points on the straight line path and the position of the obstacle;

calculating the collision index according to each interval distance and safety distance;

Alternatively, calculating the evaluation index according to the position of each selected point also including:

calculating the possible course according to the current position of the aerocraft and the position of each selected point;

calculating the course deviation according to the current course and the possible course of the aerocraft;

calculating the steering index according to the course deviation and the maximum steering rate of the aerocraft;

calculating the evaluation index according to the distance index and the collision index including:

calculating the evaluation index according to the distance index, the collision index and the steering index.

On the other hand, the disclosure provides a cooperative path planning device for automatic control aerocraft, including:

an initialization unit configured to randomly initialize the current position and the adjustment displacement of each selected point in the selected area;

an evaluation index calculation unit configured to determine the current evaluation index corresponding to each selected point according to its current position, target position and obstacle positions in the selected area;

an adjustment displacement updating unit configured to update the adjustment displacement of each selected point according to its adjustment displacement, current position, historical optimal position and global optimal position; the historical optimal position of each selected point is determined according to the current evaluation index corresponding to the current position and the optimal evaluation index corresponding to the historical position; the global optimal position is determined according to the historical optimal position of all selected points;

a position updating unit configured to update the position of each selected point according to its position and the updated adjustment displacement;

a cycle control unit configured to control the cycle execution setting times of the evaluation index calculation unit, the adjustment displacement updating unit and the position updating unit;

an evaluation index calculation unit configured to determine the current evaluation index corresponding to each selected point according to its current position, the target position of the aerocraft and the position of the obstacles in the selected area after the cycle control unit controls the execution of the setting times;

a waypoint determination unit, configured to select the position with the optimal evaluation index as the next waypoint of the aerocraft among the current positions of all the selected points and the global optimal position.

On the other hand, the disclosure also provides a storage medium for storing program code, and the program code executes the method described above after being loaded.

On the other hand, this disclosure provides an aerocraft system for planning the flight path of an aerocraft, including:

an obstacle detection sensor configured to at least monitor the obstacle position in the selected area;

a memory configured to store program code and target position;

a power device configured to drive the flight and steering of the aerocraft;

a first processor configured to load the program code and the target position stored in the memory, as well as the obstacle position monitored by the sensor, and perform the method above to determine the next waypoint.

The aerocraft path planning method provided in this disclosure can determine the historical optimal position corresponding to each selected point and the global optimal position corresponding to all selected points through the evaluation of the position of each selected point under the condition of initializing the position of each selected point and adjustment displacement. The historical optimal position and the global optimal position are used to update each selected point. After a certain number of updates, the position with the optimal evaluation index is determined as the next waypoint of the aerocraft. When planning the next waypoint of aerocraft by the above method, it is not necessary to consider whether to form a smooth curve with the waypoint passing before, so the selection of next waypoint can achieve local optimization as far as possible.

In the disclosure, the above technical solutions can also be combined with each other to realize more preferred combination schemes. Other features and advantages of the disclosure will be described in subsequent specifications, and some of the advantages may become apparent from the description or understood by implementing the disclosure. The object and other advantages of the disclosure can be realized and obtained by means of the description and the contents specially pointed out in the drawings.

BRIEF DESCRIPTION OF DRAWINGS

The drawings are only for the purpose of showing specific embodiments and are not considered to be a limitation of the disclosure. Throughout the drawings, the same reference symbols represent the same components.

wherein: 01—obstacle detection sensor; 02—memory; 03—power device; 04—first processor; 11—initialization unit; 12—evaluation index calculation unit; 13—adjustment displacement updating unit; 14—position updating unit; 15—cycle control unit; 16—waypoint determination unit.

DESCRIPTION OF EMBODIMENTS

The preferred embodiment of the present disclosure is described in detail with reference to the attached drawings. The accompanying drawings form a part of the present application and are used together with embodiments of the present disclosure to explain the principles of the disclosure and are not intended to limit the scope of the disclosure.

Before introducing the method and/or device provided by the embodiment of this specification, the aerocraft system applying the method of the embodiment is briefly introduced.

Please note that the aerocraft system mentioned in this embodiment refers to the system that can realize automatic flight path planning (please note that the aerocraft system and aerocraft may not be a device, which will be explained later) and does not carry passengers.

Figure 1:
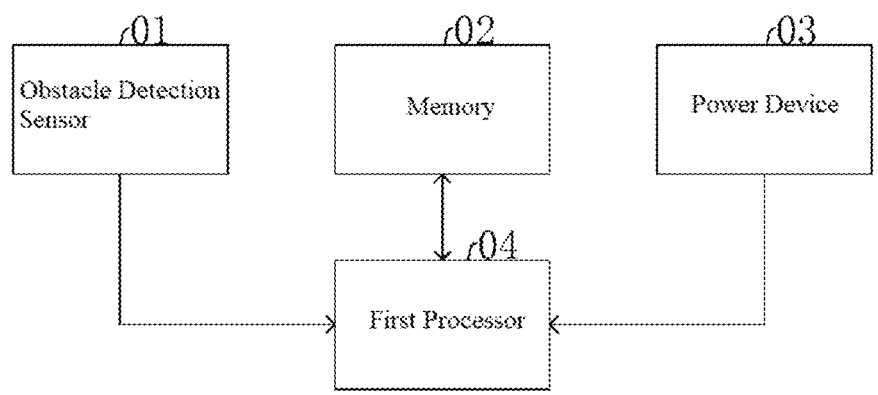
FIG. 1 is a structural diagram of an aerocraft system provided by the embodiment.

FIG. 1 is a structural diagram of an aerocraft system provided by the embodiment. As shown in FIG. 1, the aerocraft system provided by the embodiment includes an obstacle detection sensor 01, a memory 02, a power unit 03 and a first processor 04.

The obstacle detection sensor 01 detects the position of the obstacle in the detection area, so as to determine the size of the obstacle and the position of the obstacle relative to the aerocraft. In practical application, the obstacle sensor can be many types of sensors such as acoustic wave sensor, laser lidar, multi-target image acquisition equipment and so on. This embodiment does not specifically limit. In practical application, the obstacle detection sensor 01 preferably uses sensors such as acoustic wave sensor or laser radar and so on to determine the position of obstacles directly.

The power unit 03 is a device installed on the aerocraft to drive the flight and steering of the aerocraft; In the specific application of the embodiment, the aerocraft can be a fixed wing aerocraft, a rotor aerocraft, an unmanned airship, a fan wing aerocraft or a flapping wing aerocraft; correspondingly, the power device 03 is the lift generating mechanism and/or direction adjusting mechanism of the above-mentioned various types of aerocraft.

The memory 02 is used to store the program code and the target position of the aerocraft; after the above code is loaded by a processor, the corresponding path planning method (i.e., the improvement based on the implementation example of the specification) can be formed to determine the next waypoint of the aerocraft and realize the flight path planning of the aerocraft.

The first processor 04 is a processor for implementing the path planning method, that is, after loading the program code and the target position of the aerocraft stored in the memory 02, and acquiring the obstacle position detected by the obstacle sensor, the first processor 04 can execute the path planning method mentioned above to realize the automatic path planning of the aerocraft.

As mentioned above, the aerocraft system and the aerocraft may be two different devices in the embodiment of this specification. In practical application, the possible situations are as follows.

The First Case

The aerocraft system is an aerocraft; in this case, the obstacle detection sensor 01, memory 02 and the first processor 04 are all installed on the aerocraft, such that the aerocraft itself is an independent aerocraft system with the functions of acquiring obstacle position, planning path and controlling power device 03.

The Second Case

The aerocraft is only a part of the aerocraft system; at least some of the aforementioned obstacle sensors, memory 02 and first processor 04 are not installed on the aerocraft, but are independent of the aerocraft settings.

For example, in one case, the obstacle detection sensor 01 is installed in the aerocraft flight scene, which can detect the obstacles and aerocraft in the aerocraft flight scene; the memory 02 and the first processor 04 are installed in a remote server.

Correspondingly, the remote server and the aerocraft are provided with a communication device to send the waypoint calculated by the first processor 04 to the aerocraft, or send the flight control command determined according to the waypoint to the aerocraft, and the second processor in the aerocraft controls the power unit 03 according to the waypoint or flight control command.

For another example, the obstacle detection sensor 01 is installed on the aerocraft, while the memory 02 and the first processor 04 are installed on the remote server. Correspondingly, aerocraft and the remote server are provided with a communication device. The position of the obstacle detected by the obstacle detection sensor 01 is sent to the remote server through the communication device. After the first processor 04 in the remote server generates the waypoint or flight control command according to the position of the obstacle and other information, the remote server sends the waypoint or flight control command to the aerocraft, and the second processor of the aerocraft controls the power unit 03 according to the waypoint or flight control command.

Figure 2:
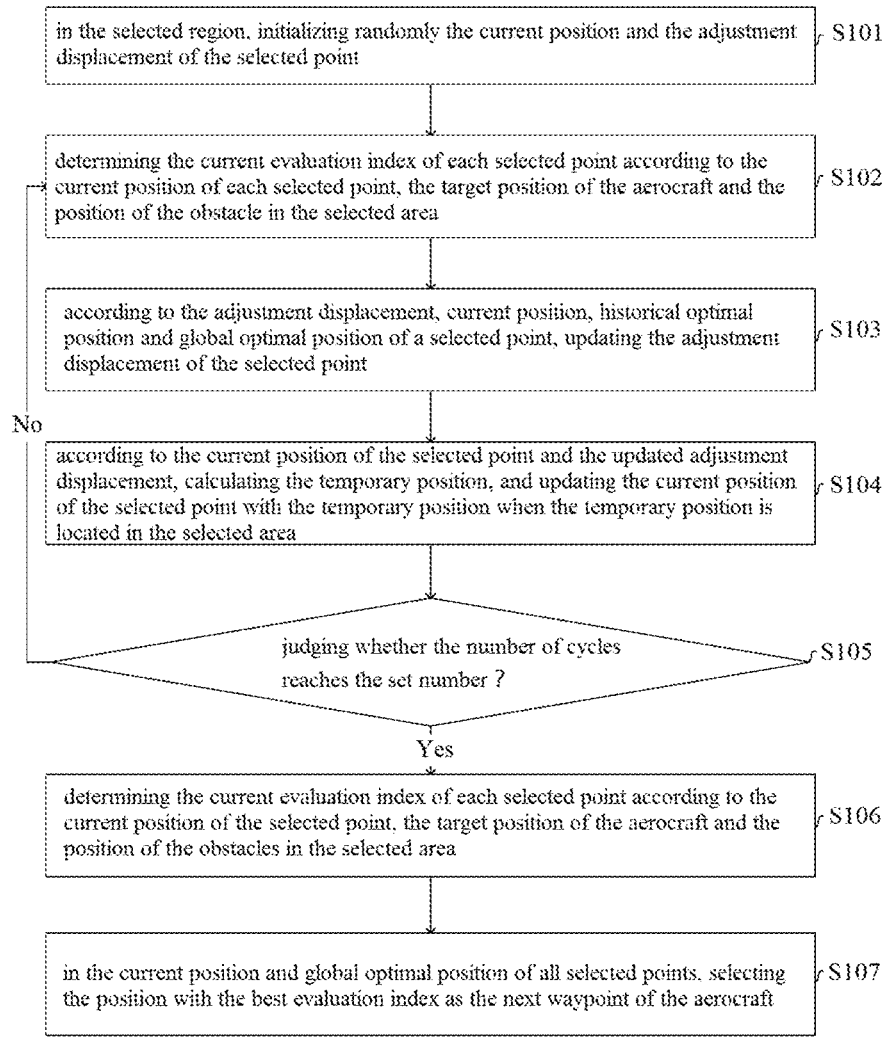
FIG. 2 is a flow chart of the cooperative path planning method of the automatic control aerocraft provided by the embodiment.

FIG. 2 is a flow chart of the cooperative path planning method of the automatic control aerocraft provided by the embodiment. As shown in FIG. 2, the aerocraft path planning method provided by the embodiment includes steps S101-S107.

S101: In the selected area, the current position and the adjustment displacement of each selected point is initialized randomly.

In this embodiment, the selected area is an area determined according to the characteristics of the aerocraft, the flight scene and so on, and is used to select the next waypoint. According to the different characteristics of aerocraft and flight scene, the selected area is different accordingly.

For example, if the aerocraft is a rotorcraft, the selected area can be the sphere range with the aerocraft as the center of the sphere and a certain length as the radius. When the aerocraft is a fixed wing aerocraft, the selected area can be parts of sphere area with the aerocraft position as the center and a certain length as the radius in the flight direction of the aerocraft, or the cube area or cuboid area in the flight direction of the aerocraft.

In the specific application of the present embodiment, the aforementioned length determination methods may be different. For example, in the case that the obstacle detection sensor 01 is integrated into an aerocraft, the aforementioned length may be the detection radius of the obstacle sensor or smaller than the detection radius of the obstacle sensor.

In a specific application of the present embodiment, the obstacle detection sensor 01 is integrated into the aerocraft, the aforementioned selected area is set as a sphere or parts of sphere with a radius of a certain length taking the position of the aerocraft as the center of the sphere. In order to reduce the probability of collision between the aerocraft and the obstacle, a set length is determined according to the situation of the obstacles in the scene. Specifically, the determination steps of the selected area include S1011-S1014.

S1011: determining the obstacle area within the sphere or parts of sphere determined by taking the aerocraft position as the center of the sphere and taking the first length as the radius.

The first length is the detection radius of the obstacle detection sensor 01. In step S1011, the obstacle sensor integrated in the aerocraft works to determine the obstacles within its detection range.

Because the obstacle sensor is installed in the aerocraft, the obstacle detected by the obstacle sensor is represented by the surface of the obstacle facing the aerocraft.

It should be noted that if the first obstacle is located between the second obstacle and the obstacle detection sensor 01, the second obstacle cannot be detected by the aerocraft. In order to overcome this problem, a specific application of the embodiment has been simplified, the area determined by the surface of the obstacle directly facing the aerocraft and the projection of the said surface on the surface of the sphere or the spherical crown corresponding to the parts of sphere is identified as the obstacle area.

S1012: determining the projected area of the obstacle area on the surface of the sphere or the spherical crown surface corresponding to the parts of sphere.

In a specific application of the present embodiment, step S1012 is to determine the projected area of the obstacle area on the spherical surface or the spherical crown surface corresponding to the parts of sphere determined with the aerocraft position as the sphere center and the first length as the radius.

S1013: the set length is determined according to the projected area and the first length.

In a specific application of the present embodiment, the range determined by the detection radius (i.e., the first length) of the obstacle sensor is not directly taken as the selected area, but the set length determined by the aforementioned projected area and the first length.

According to the analysis of steps S1011 and S1012, the size of the projected area is negatively correlated with the distance between the obstacle and the aerocraft and is positively correlated with the area of the obstacle itself facing the obstacle sensor. Therefore: (1) When the distance between the obstacle and the aerocraft is determined, the larger the surface area of the obstacle facing the obstacle sensor is, the larger the projected area is; (2) When the area of the obstacle facing the obstacle sensor is determined, the closer the distance between the obstacle and the aerocraft is, the larger the projected area is. Therefore, the set length is determined according to the distance between the obstacle and the aerocraft and the surface area of the obstacle facing the aerocraft.

In a specific application of the embodiment, when the detection area of the obstacle sensor is a sphere area, the set length is determined by Formula 1.

$$R_F(t+1) = R_D \cdot \frac{4\pi R_D^2}{S(t+1)^\alpha + 4\pi R_D^2} \quad \text{Formula 1}$$

In Formula 1, $R_F(t+1)$ is the set length, $R_D$ is the first length, $S(t+1)$ is the projected area, $4\pi R_D^2$ is the surface area of the sphere. $\alpha$ is the set exponential factor, and the larger the a, the greater the influence of the projection area on the determination of the set length.

S1014: setting the sphere range or the parts of sphere range determined with the aerocraft position as the center of the sphere and the set length as the radius as the selected area.

According to the analysis of steps S1011-S1013, the size of the set length is positive correlation to the distance from the obstacle to the aerocraft, and is negative correlation to the size of the surface area of the obstacle facing the aerocraft. Therefore, the size of the selected area is positive correlation to the distance from the obstacle to the aerocraft and negative correlation to the size of the surface area of the obstacle facing the aerocraft.

When the selected area is determined by the above method, when there are many obstacles and the obstacles are close to the aerocraft, the scope of the selected area can be reduced adaptively, and then the selection of aerocraft waypoints can be reduced, and the probability of collision between aerocraft and obstacles can be reduced.

In the specific application of the above embodiment, the selected area is a sphere or a spherical crown, and in other specific applications, the selected area can also be a cuboid area or a cube area. In addition, the aforementioned projection is not limited to the projection on the surface of a sphere or a spherical crown, but can also be a projection on a plurality of surfaces of a cuboid or a cube.

In the specific application of the above embodiment, the obstacle sensor is integrated in the aerocraft. In other specific applications of the embodiment, the obstacle detection sensor 01 can also be set independently of the aerocraft. In this case, after the obstacle detection sensor 01 detects the obstacles, it can convert the position of various obstacles to the aerocraft coordinate system, and determine the selected area by the above method. It should be noted that when the obstacle detection sensor 01 determines the set length, it is necessary to set another length, instead of using the detection distance of the obstacle sensor.

It should also be noted that if the obstacle sensors are not integrated into the aerocraft, and the number and position of the obstacle detection sensors 01 are reasonable, the obstacle sensor may detect all obstacles in a certain area, determine the surface morphology of all obstacles, and determine the set length by using the volume of all obstacles.

In the specific application of the embodiment, the number of randomly initialized selected points in step S101 can be two or more. Of course, in order to ensure the operation efficiency and determine the reasonable waypoint as far as possible, multiple selected points are preferred in the specific application.

Step S102: The current evaluation index corresponding to each selected point is determined according to its current position, the target position of the aerocraft and the position of the obstacles in the selected area.

In the specific application of the embodiment, an ideal target is that the aerocraft can reach the target position in the shortest possible path without collision with obstacles. According to the above objectives, the current evaluation indexes used to evaluate the advantages and disadvantages of each selected point can include distance index and collision index.

The distance index is used to indicate the length rating index of the aerocraft passing through the selected point; the collision index is used to indicate the evaluation index of the possibility of collision between the aerocraft from the position to the selected point and the obstacles.

In a specific application of the present embodiment, the method for calculating the distance index may include steps S201-S202.

S201: calculating the first distance from the aerocraft position to the selected point, the second distance from the aerocraft position to the target location, and the third distance from the selected point to the target position.

S202: calculating the distance index according to the first distance, the second distance and the third distance.

The above steps S201 and S202 are expressed by formula 2.

$$f_1(t+1) = A + B;$$ Formula 2

Where $$A = \frac{\sqrt{(r_x(t+1) - r_x(t))^2 + (r_y(t+1) - r_y(t))^2 + (r_z(t+1) - r_z(t))^2}}{\sqrt{((r_x(T) - r_x(t))^2 + (r_y(T) - r_y(t))^2 + (r_z(T) - r_z(t))^2}};$$

$$B = \frac{\sqrt{((r_K(T) - r_x(t+1))^2 + (r_y(T) - r_y(t+1))^2 + (r_z(T) - r_z(t+1))^2}}{\sqrt{((r_x(T) - r_x(t))^2 + (r_y(T) - r_y(t))^2 + (r_z(T) - r_z(t))^2}};$$

$$\vec{r}(t) : (r_x(t), r_y(t), r_z(t))$$

is the current position coordinate of the aerocraft, $(r_x(T), r_y(T), r_z(T))$ is the target position coordinate of the aerocraft, $(r_x(t+1), r_y(t+1), r_z(t+1))$ is the position coordinate of the selected point.

According to the analysis of formula 2, in a specific application of the embodiment, the calculated distance index takes the second distance as the reference, calculates the first ratio of the first distance and the second distance, and the second ratio of the third distance and the second distance, and then takes the sum of the first ratio and the second ratio as the distance index.

In some specific applications of the embodiment, only the ratio of the third distance to the second distance can be used as the distance index.

In other specific applications of the embodiment, the sum of the first distance and the third distance, or the third distance, can be used as the distance index.

In a specific application of the present embodiment, the method for calculating the collision index may include steps S301-S302.

S301: determining the straight line path according to the position of the aerocraft and the position of the selected point.

S302: calculating the collision index according to the straight path and the position of the obstacles.

In the specific application of this embodiment, it is assumed that the aerocraft travels from one waypoint to next waypoint in a straight-line flight mode. Therefore, the relationship between the position of the point on the straight path and the position of the obstacles can be used to calculate the collision index.

According to the different application scenarios, obstacles may be fixed obstacles, moving obstacles, or both fixed obstacles and moving obstacles.

When the obstacle is a fixed obstacle, the collision index is a static collision index. In a specific application, method of calculating the static collision index includes steps S3011-S3012.

S3011: dividing the straight path into M segments at equal intervals to obtain M−1 segmentation points.

S3012: according to the position of the selected point, the position of the segmentation points and the position of the fixed obstacles, the static collision index is calculated.

In this embodiment, the static collision index is calculated by formula 3 and formula 4.

$$C_1 = \sum_{j=1}^{M} c_{j1}(t+1)$$ Formula 3

Where $$c_{j1}(t+1) = \begin{cases} 1, & \text{the } j\text{th endpoint is within the range of the obstacle} \\ 0, & \text{other situations} \end{cases}$$ Formula 4

Here endpoint means the selected point and each segmentation point.

According to formula 3 and 4, if the selected point is within the range of obstacles, the static collision index is at least 1. When the range of obstacle area is determined by S1011 and the selected point is within the range of obstacles, the farther the selected point is from the current position, the larger the corresponding static collision index will be.

When the obstacle is a dynamic obstacle, the collision index is a dynamic collision index. In a specific application, the method of calculating dynamic collision index includes steps S3021-S3022.

S3021: dividing the straight path into M segments at equal intervals to obtain M−1 segmentation points.

It should be noted that M in step S3021 and M in step S3011 may be the same or different, and this embodiment is not limited.

S3022: calculating the corresponding interval distance according to the coordinates of the selected point, the coordinates of the segmentation points and the coordinate of each moving obstacle.

In step S3022, according to the coordinates of the selected point and the coordinates of each segmentation point, the separation distance from the moving obstacle is determined respectively. It should be noted that in the case where the segmentation point or selected point is within the range of the obstacle, the above-mentioned interval distance can be set to 0 or a negative number (the negative number represents that the corresponding point is within the obstacle range, which represents the distance from the corresponding point to the obstacle surface).

S3023: the dynamic collision index is calculated according to the interval distance and safety distance.

In the specific application of the embodiment, although the obstacle has been determined to be a moving obstacle, the moving characteristics of the moving obstacle cannot be determined, that is, the moving direction and moving speed of the moving obstacle cannot be accurately determined (Of course, in some cases, the moving state of the obstacle can be determined according to the historical measurement results of the obstacle detection sensor 01, but the amount of data processing is large, and the accuracy of the moving direction and speed of the moving obstacle cannot be guaranteed).

In order to overcome the problem that the speed of moving obstacles cannot be detected, the embodiment assumes that the moving distance of each moving obstacle is at most a safe distance during the flight of aerocraft from the current position to the next waypoint. It is conceivable that the above assumption is reasonable when the flight time of aerocraft from the current position to the next waypoint is short.

If the distance between each endpoint and the obstacle is greater than the safe distance, the aerocraft will not collide with the moving obstacle; If the distance between an endpoint and a moving obstacle is less than the safe distance, it is proved that the distance between the aerocraft passing the endpoint and the moving obstacle is too close, and the possibility of collision between the aerocraft and the moving obstacle increases. Based on the above analysis, dynamic collision index can be calculated according to the size of interval distance and safety distance.

In a specific application of the embodiment, the dynamic collision index can be calculated by formula 5 and formula 6.

$$C_2 = \sum_{j=1}^{M} c_{j2}(t+1) \quad \text{Formula 5}$$

$$c_{j2}(t+1) = \begin{cases} \dfrac{R_s - D_j(t+1)}{R_s}, & D_j(t+1) < R_s \\ 0, & D_j(t+1) \geq R_s \end{cases} \quad \text{Formula 6}$$

In formula 5 and formula 6, $R_s$ represents the safe distance, $D_j(t+1)$ represents the distance between the j-th endpoint and the obstacle, and $c_{j2}(t+1)$ is the dynamic collision index corresponding to the j-th endpoint.

In the specific application of the embodiment, on a straight line path, the corresponding safety distance of each endpoint can be the same or different.

In one case, the corresponding safety distance from the current position of the aerocraft to the endpoint increases in turn. Through the analysis, it can be seen that the problem that the probability of collision between moving obstacles and aerocraft increases with time accumulation can be reduced.

In addition to the above method for determining the dynamic collision index, in another application of the present embodiment, the area expanded according to the edge of the obstacle can be determined by adding the range and safe distance of the obstacle, and this area can be regarded as a non safety area, and then the dynamic collision index can be calculated by using the above-mentioned steps of determining the static collision index with the non safety area and the straight-line path.

In a specific application of the embodiment, when the obstacles in the selected area include fixed obstacles and moving obstacles, the collision index is the result of the sum of static collision index and dynamic collision index.

And the collision index can be calculated as: $f_2(t+1)=C_1+C_2$.

It should be noted that the premise of distinguishing moving obstacles from fixed obstacles in the previous description is that the obstacle sensor can identify whether the obstacles are fixed obstacles or moving obstacles through the obstacle signal detected at different times.

However, in some practical applications, it is not feasible to distinguish whether the obstacles in the selected area are fixed obstacles or moving obstacles. In this case, all obstacles in the selected area can be assumed to be moving obstacles, and the dynamic collision index determined in the previous paper can be used as the collision index.

According to the previous description, after determining the distance index and collision index, the current evaluation index can be calculated according to the distance index and collision index.

In a specific application, formula 7 can be used to calculate the current evaluation index.

$$F(t+1)=\lambda_1 f_1(t+1)+\lambda_2 f_2(t+1) \quad \text{Formula 7}$$

In formula 7, $f_1(t+1)$ is the distance index, $f_2(t+1)$ is the collision index, $\lambda_1$ and $\lambda_2$ is the weight coefficient.

In other specific applications of the present embodiment, in addition to the aforementioned distance index and collision index, the resource consumption (which can be the steering cost) caused by the change of aerocraft course may also be considered. The resource consumption caused by the change of aerocraft course is represented by steering index. A method for determining a steering index comprises steps S3031-S3033.

S3031: calculating the possible course according to the current position of the aerocraft and the position of each selected point.

In the specific application of the embodiment, the possible course of the aerocraft is expressed by the vector direction determined by the current position and each selected point, that is, the possible course mentioned above is the direction determined from the current position of the aerocraft to each selected point.

S3032: calculating the course deviation according to the current and possible course of the aerocraft.

The current course of the aerocraft can be the moving direction of the aerocraft at the current position, or the direction determined by the current position and the nearest waypoint that has passed. This embodiment does not make specific restrictions.

In practical application, the course deviation is calculated according to the current and possible course of the aerocraft, that is, the change of flight direction when the aerocraft flies from the current position to the next waypoint which is calculated. It can be determined that the course deviation is an angle. According to the actual situation, the course deviation is between 0° and 180°.

S3033: calculating the steering index according to the course deviation and the maximum turning rate of the aerocraft.

Step S3033 is the comparison result obtained by comparing the course deviation with the maximum steering rate of the aerocraft, and the comparison result is used as the steering index.

In the specific application of the embodiment, the steering index can be obtained by formula 8.

$$\theta(t+1) = \arccos\left(\frac{P \cdot Q^T}{\|P \cdot Q\|}\right) \qquad \text{Formula 8}$$

$$f_3(t+1) = \frac{\theta(t+1)}{\theta_{max}}$$

$\theta_{max}$ is the maximum turning rate of the aerocraft.

In formula 8, P is the vector representing the current course and Q is the vector representing the possible course. In one application, $P=(r_x(t)-r_x(t-1), r_y(t)-r_y(t-1), r_z(t)-r_z(t-1))$, $Q=(r_x(t+1)-r_x(t), r_y(t+1)-r_y(t), r_z(t+1)-r_z(t))$.

Of course, in some applications, the course deviation can also be used as the steering index, or the corresponding value can be determined as the steering index according to looking up the comparison table corresponding to the course deviation.

When the current evaluation index includes the steering index, formula 9 can be used to calculate the current evaluation index.

$$F(t+1)=\lambda_1 f_1(t+1)+\lambda_2 f_2(t+1)+\lambda_3 f_3(t+1) \qquad \text{Formula 9}$$

In formula 9, $f_1(t+1)$ is the distance index, $f_2(t+1)$ is the collision index, $f_3(t+1)$ is the course index, $\lambda_1$, $\lambda_2$ and $\lambda_3$ is the weight coefficient.

After step S102 is completed and the current evaluation index corresponding to each selected point is determined, step S103 can be executed.

Step S103: According to the adjustment displacement, current position, historical optimal position and global optimal position of each selected point, the adjustment displacement of each selected point is updated.

The historical optimal position mentioned in step S103 refers to the position corresponding to the optimal evaluation index of each selected point, and the historical optimal position of each selected point is determined according to the current evaluation index corresponding to the current position and the optimal evaluation index corresponding to the historical optimal position.

The global optimal position mentioned in step S103 refers to the position with the highest evaluation index among the historical optimal positions of all selected points.

In the embodiment of the specification, step S103 is used to update the adjustment displacement of each selected point.

It should be noted that the adjustment displacement in this embodiment is a vector, which represents the displacement from the current position of each selected point to the next calculated position of the selected point. It is conceivable that the adjustment displacement can be expressed by a three-dimensional vector.

In the specific application of the embodiment, according to the adjustment displacement, current position, historical optimal position, and the global optimal position of each selected point, there are several methods for updating the adjustment displacement of each selected point.

Method 1

Method 1 may include steps S401-S403.

S401: calculating the self-learning displacement according to the self-learning coefficient, historical optimal position and current position of each selected point. In a practical application, the self-learning displacement can be expressed by formula 10.

$$v_{i1}=U(0,c_1)\cdot(pbest_i-x_i) \qquad \text{Formula 10}$$

In formula 10, $U(0, c_1)$ is the self-learning coefficient, which represents the random number in $(0, c_1)$, $c_1$ is a preset constant. According to formula 10, the self-learning displacement is directly proportional to the difference between the historical optimal position and the current position, and is proportional to the self-learning coefficient. $pbest_i$ is the historical optimal position of the i-th selected point, $x_i$ is the current position of the i-th selected point.

S402: calculating the global learning displacement according to the global learning coefficient, global optimal position and current position of each selected point. In a specific application, the global learning displacement can be expressed by formula 11.

$$v_{i2}=U(0,c_2)\cdot(gbest-x_i)) \qquad \text{Formula 11}$$

In formula 11, $U(0, c_2)$ is the global learning coefficient, which represents the random number in $(0, c_2)$, $c_2$ is also a preset constant. According to formula 11, the global learning displacement is positive correlation to the difference between the global optimal position and the current position, and is positive correlation to the global learning coefficient.

S403: updating the adjustment displacement of each selected point according to the adjustment displacement, corresponding self-learning displacement and global learning displacement.

Step S403 may be represented by formula 12.

$$v_i=\eta\cdot(v_i+v_{i1}+v_{i2}) \qquad \text{Formula 12}$$

In formula 12, $\eta$ is the adjustment coefficient.

According to formula 12, the updated adjustment displacement of each selected point is obtained by summation of the current adjustment displacement, the latest calculated self-learning displacement and the global learning displacement.

According to the analysis of S401-S403, in method 1, the self-learning displacement and global learning displacement are relatively independent, and there is no direct correlation between them.

Note that in method one, $c_1$, $c_2$ is self-learning coefficient and global learning coefficient, either of which can be greater than 1 or less than 1.

Method 2

Method 2 includes steps S501-S503.

S501: calculating the self-learning displacement according to the self-learning probability, historical optimal position and current position of each selected point.

Step S501 can be represented by formula 13.

$$v_{i1}=p_i\cdot(pbest_i-x_i) \qquad \text{Formula 13}$$

In formula 13, $p_i$ is the self-learning probability of the i-th selected point, $pbest_i$ is the historical optimal position of the i-th selected point, $x_i$ is the current position of the i-th selected point.

S502: calculating the global learning displacement according to the global learning probability, global optimal position and current position of each selected point.

Step S502 can be represented by formula 14.

$$v_{i2}=(1-p_i)\cdot(gbest-x_i)) \qquad \text{Formula 14}$$

In formula 14, the global learning probability of the i-th selected points is $1-p_i$. In other words, the sum of global learning probability and self-learning probability of the i-th selected point is 1. gbest is the global optimal position of all the selected points, $x_i$ is the current position of the i-th selected point.

S503: updating the adjustment displacement of each selected point according to the adjustment displacement, corresponding self-learning displacement and global learning displacement.

The adjustment displacement determined in step S503 can be expressed by formula 15.

$$v_i = \eta \cdot (v_i + c_1 \cdot v_{i1} + c_2 \cdot v_{i2})$$ Formula 15

In formula 15, $\eta$ is the adjustment coefficient.

According to formula 15, the updated adjustment displacement of each selected point is obtained through the current adjustment displacement, the calculated self-learning displacement and the global learning displacement.

In the method 2, the sum of self-learning probability and global learning probability of each selected point is 1. When the probability of one of them increases, the other probability decreases correspondingly. That is to say, the change of the self-learning displacement and the global learning displacement of each selected point is not independent, but there is a relationship between them. In this way, it can ensure that the change of the adjustment displacement is in a reasonable range, and make the change of the adjustment displacement reasonable.

In method 2, the acquisition method of self-learning probability is different according to different situations; for example, in a specific application of an embodiment, the acquisition method of self-learning probability includes steps S5011-S5015.

S5011: judging whether the adjustment displacement is the first update; if yes, execute S5012; if not, execute S5013.

S5012: initializing the self-learning probability randomly.

S5013: randomly selecting another selected point; judging whether the evaluation index corresponding to the historical optimal position of another selected point is less than or equal to the current evaluation index corresponding to the historical optimal position of each selected point; if so, execute step S5014; if not, execute S5015.

S5014: keeping the self-learning probability of each selected point unchanged.

S5015: updating the self-learning probability of each selected point according to the learning coefficient, the self-learning probability of another selected point and the self-learning probability of each selected point.

In a specific application, step S5015 can be represented by formula 16.

$$p_i = p_i + \beta \cdot (p_q - p_i)$$ Formula 16

In formula 16, $p_i$ is the self-learning probability of the i-th selected point, $p_q$ is the self-learning probability of another selected point, and $\beta \in [0,1]$ is the learning coefficient. According to formula 16, the steps to update the self-learning probability are as follows: first, calculating the difference between the self-learning probability of another selected point and the self-learning probability of the i-th selected point, calculating the adjustment value according to the probability difference and learning coefficient, and update the self-learning probability corresponding to the i-th selected point according to the self-learning probability and probability adjustment value of the i-th selected point.

The self-learning probability of each selected point is modified by S5011-S5015, and the global learning probability is also modified. By using this method, the intelligence and balance of selection of selected points in the solution process can be realized, and the problem of multimodal function can be solved better.

In other applications of the present embodiment, the self-learning probability of each selected point can be set randomly every time, and is not limited to the method determined in the preceding steps S5011-S5015.

After completing step S103, performing step S104.

Step S104: According to the current position of each selected point and its updated adjustment displacement, the temporary position is calculated, and the current position of each selected point is updated with the temporary position when the temporary position is located in the selected area.

In step S104, according to the position of each selected point and its updated adjustment displacement, the calculation of the temporary position is a process of calculating a new position with the position of each selected point as the starting point and the adjustment displacement as the displacement; in specific application, the calculation method of the temporary position can be expressed by formula 17.

$$x_i = x_i + v_i$$ Formula 17

In formula 17, $x_i$ is the position of the i-th selected point, $v_i$ is the adjustment displacement of the i-th selected point.

In order to avoid that the calculated temporary position is outside the selected area, in the embodiment of this specification, after calculating the temporary position of each selected point, it is also necessary to judge whether the temporary position is within the selected area; if the temporary position is within the selected area, the temporary position can be updated to the position of each selected point, and then step S105 is executed; if the temporary position is outside the selected area, then you need to go back to step S103 to recalculate the adjustment displacement and perform this step again.

Step S105: judging whether the number of cycles reaches the set number; if so, execute step S106; if not, re-execute steps S102-S105.

In order to select as many positions as possible in the selected area to judge whether it can be used as the next waypoint, in this embodiment, each selected point needs to go through a set number of iterations. Step S105 is used to judge whether the iteration number of each selected point reaches the set number. If the number of iterations of each selected point does not reach the set number, then re-execute steps S102-S105.

Step S106: determining the current evaluation index of each selected point according to the current position of each selected point, the current and target position of the aerocraft and the position of the obstacles in the selected area.

Since the execution process of step S106 is the same as that of step S102, the content of step S106 will not be described here. For related contents, please refer to the description of step S102 mentioned above.

S107: in the current positions and global optimal position of all selected points, the position with the best evaluation index is selected as the next waypoint of the aerocraft.

After the execution of step S106, the current evaluation index corresponding to the current position of all selected points after the last iteration is determined; at the same time, the evaluation index corresponding to the historical optimal position of all selected points has been determined before the last iteration, so the current evaluation index of each selected point and the evaluation index corresponding to the historical optimal position can be compared to determine the best evaluation index. We take the position corresponding to the best evaluation index as the next waypoint of the aerocraft.

According to the analysis of steps S101-S107, the aerocraft path planning method provided in the embodiment of this specification can determine the historical optimal position corresponding to each selected point and the global optimal position corresponding to all selected points through the evaluation of the position of each selected point under the condition of initializing the position of each selected point and adjusting the displacement, and the historical optimal position and the global optimal position can be used to update the position of each selected point. After updating a certain number of times, the position with the best evaluation index is determined as the next waypoint of the aerocraft.

It can be imagined that the aerocraft path planning method determined by steps S101-S107 is used to plan the next waypoint of the aerocraft without considering whether to form a smooth curve with the waypoint passed before, so that the selection of waypoints can achieve local optimization as far as possible.

In the specific application of the embodiment, the deadlock problem may occur when the aerocraft flies to a special area. Deadlock problem refers to the problem that the aerocraft can move in a certain area after entering the certain area but cannot fly out of the certain area to reach the target position.

Figure 3:
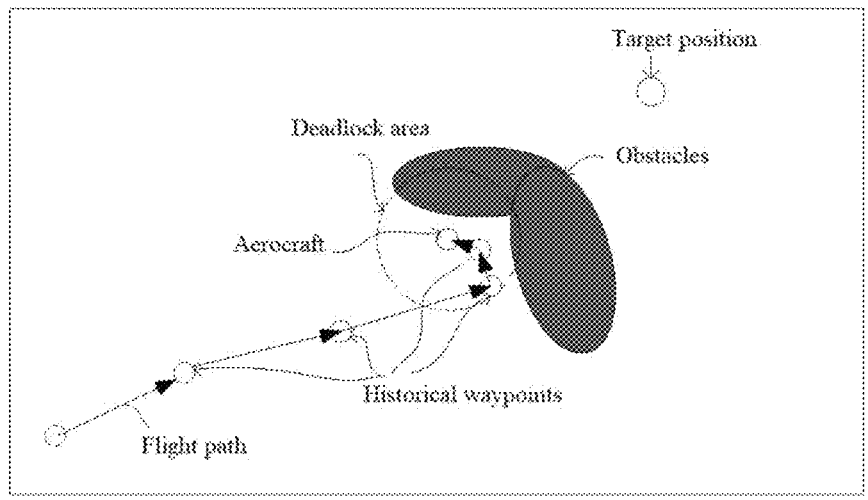
FIG. 3 is a schematic diagram of a deadlock scenario provided by the embodiment.

FIG. 3 is a schematic diagram of a deadlock scenario provided by the embodiment. As shown in FIG. 3, in some flight scenarios, because the obstacle is between the target position and the current position, after flying to the current position, the calculated waypoint may still be on the side where the obstacle is far away from the target position when determining the selected area and calculating the next waypoint; and then, multiple waypoints planned by the aerocraft are located on the side where the obstacle is far away from the target position. At this time, the aerocraft enters the deadlock area (i.e. deadlock problem) and cannot fly out.

In order to solve the above problem, in a specific application of the embodiment, the position of the waypoint passed by the aerocraft is also recorded in the flight process. If the position deviation of multiple waypoints continuously passed by the aerocraft is less than the set value, the sphere range with the aerocraft position as the center and the fourth length as the radius is excluded from the selected area; the above-mentioned fourth length is less than the set length. It can be imagined that, if a deadlock problem occurs, the embodiment will determine a deadlock area and exclude the deadlock area from the selected area. Therefore, in the subsequent waypoint selection process, the aerocraft will not select the waypoint in the deadlock area, but select the waypoint outside the deadlock area to ensure the flight out of the deadlock area. In practical application, the deadlock area can be maintained for a certain period to ensure that the aerocraft will not fly into the area delineated by the deadlock area again after flying out of the deadlock area.

In addition to providing the aforementioned cooperative path planning method for the automatic control aerocraft, the embodiment of the specification also provides a cooperative path planning device for automatic control aerocraft. Because the cooperative path planning device for the automatic control aerocraft and the above-mentioned method are based on the same application concept, they solve the same technical problems and achieve the same technical effect. Therefore, the structure of the cooperative path planning device of the automatic control aerocraft is introduced in the following. The related technical problems and technical effects can be described in the method section.

A cooperative path planning device of automatic control aerocraft, comprising: a first processor, a second processor, a third processor, a fourth processor, a fifth processor and a sixth processor, wherein in selected area, the first processor initializes randomly current position and adjustment displacement of each selected point; the second processor determines current evaluation index of each selected point according to its current position, the target position of the aerocraft and the position of an obstacle in the selected area; the third processor updates the adjustment displacement of each selected point according to its adjustment displacement, the current position, historical optimal position and global optimal position of each selected point; determines the historical optimal position of each selected point according to its current evaluation index and optimal evaluation index corresponding to the historical position; the global optimal position is the position with the best evaluation index among the historical optimal positions of all selected points; the fourth processor calculates temporary position according to the current position of each selected point and its updated adjustment displacement, and updates the current position of each selected point with the temporary position when the temporary position is located in the selected area; the fifth processor determines the current evaluation index corresponding to each selected point again according to its current position, the target position of the aerocraft and the position of the obstacles in the selected area; the sixth processor selects the position corresponding to the optimal evaluation index as the next waypoint of the aerocraft among the current positions of all the selected points and the global optimal position.

The third processor comprises: a first subprocessor, a second subprocessor, and a third subprocessor, wherein the first subprocessor calculates self-learning displacement according to self-learning probability, the current position and the historical optimal position of each selected point; the second subprocessor calculates global learning displacement according to global learning probability, the current position and the global optimal position of each selected point; the third subprocessor updates the adjustment displacement of each selected point according to its adjustment displacement, self-learning displacement and global learning displacement of the selected point, wherein the sum of the self-learning probability and the global learning probability is 1.

Wherein initializing randomly the self-learning probability when the adjustment displacement is the first update; when the adjustment displacement is not the first update, obtaining the self-learning probability comprising: selecting randomly another selected point; keeping the self-learning probability of each selected point unchanged when the evaluation index corresponding to the historical optimal position of the other selected point is less than or equal to the evaluation index corresponding to the historical optimal position of each selected point; updating the self-learning probability corresponding to each selected point according to the learning coefficient, the self-learning probability of the other selected point and the self-learning probability of each selected point when the evaluation index corresponding to the historical optimal position of the other selected point is larger than the evaluation index corresponding to the historical optimal position of each selected point.

Updating the self-learning probability of each selected point according to the learning coefficient, the self-learning probability of the other selected point and the self-learning probability of each selected point comprising: calculating probability difference between the self-learning probability of the other selected point and the self-learning probability of each selected point; calculating probability adjustment value according to the probability difference and the learning coefficient; and updating the self-learning probability corresponding to each selected point according to the self-learning probability and the probability adjustment value of each selected point.

Wherein determining the selected area comprise: determining obstacle area within the sphere area or the parts of sphere area with the aerocraft position as the sphere center and the first length as the radius, and determining projected area of the obstacle area on the spherical surface or the spherical crown surface corresponding to the parts of sphere; determining set length according to the projected area and the first length; setting sphere range or parts of sphere range with the aerocraft position as the sphere center and the set length as the radius as the selected area.

Wherein the determining the selected area comprise: excluding the sphere range or parts of sphere range determined by taking the aerocraft position as the sphere center and the fourth length as the radius from the selected area, when the position deviation of multiple waypoints continuously passed by the aerocraft is less than the set deviation; the fourth length is less than the set length.

Determining the current evaluation index corresponding to each selected point according to its current position, the target position of the aerocraft and the position of the obstacles in the selected area comprising: calculating first distance from the aerocraft position to each selected point, second distance from the aerocraft position to the target position, and third distance from each selected point to the target position; calculating distance index according to the first distance, the second distance and the third distance; and determining possible straight line path according to the aerocraft position and each selected point; calculating collision index according to the straight line path and the position of the obstacles; calculating evaluation index according to the distance index and the collision index.

Wherein the obstacles comprise fixed obstacles and moving obstacles; calculating the collision index according to the straight line path and the position of the obstacles comprises: calculating static collision index according to the endpoints on the straight path and the position of each fixed obstacle; and/or, calculating corresponding interval distance according to the endpoints on the straight line path and the positions of the moving obstacle; calculating dynamic collision index according to each interval distance and safety distance; calculating the collision index according to the static collision index and the dynamic collision index.

Wherein calculating the evaluation index according to the position of each selected point also comprising: calculating possible course according to the current position of the aerocraft and the position of each selected point; calculating course deviation according to the current course and the possible course of the aerocraft; calculating steering index according to the course deviation and the maximum steering rate of the aerocraft; calculating the evaluation index according to the distance index and the collision index comprising: calculating the evaluation index according to the distance index, the collision index and the steering index.

Each of the first processor, the second processor, the third processor, the fourth processor, the fifth processor and the sixth processor is independent processor, or all of them are integrated in a single processor. All of the first subprocessor, the second subprocessor, and the third subprocessor are integrated in a single processor.

Figure 4:
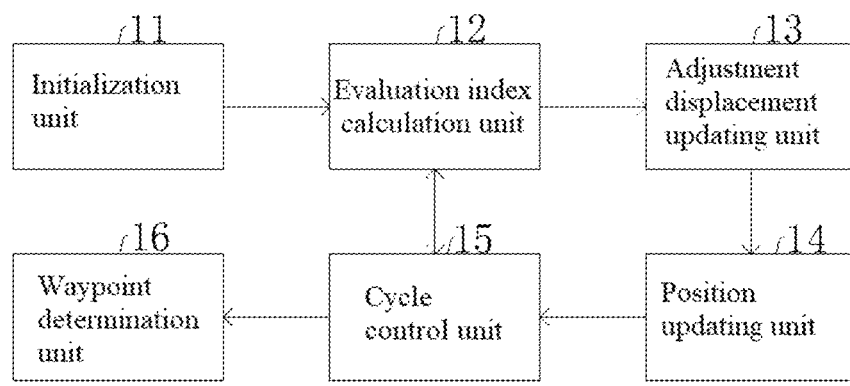
FIG. 4 is a schematic diagram of an aerocraft path planning device provided by the embodiment.

FIG. 4 is a schematic diagram of a cooperative path planning device for automatic control aerocraft provided by the embodiment. As shown in FIG. 4, the device of this embodiment includes initialization unit 11, evaluation index calculation unit 12, adjustment displacement updating unit 13, position updating unit 14, cycle controlling unit 15 and waypoint determination unit 16.

The initialization unit 11 is used to randomly initialize the current position and adjustment displacement of each selected point in the selected area.

The evaluation index calculation unit 12 is used to determine the current evaluation index corresponding to each selected point according to its current position, target position and obstacle position in the selected area.

The adjustment displacement updating unit 13 is used to update the adjustment displacement of each selected point according to its adjustment displacement, current position, historical optimal position and global optimal position; The historical optimal position of each selected point is determined by the current evaluation index corresponding to the current position and the optimal evaluation index corresponding to the historical position; the global optimal position is determined according to the historical optimal position of all selected points.

The position updating unit 14 is used to update the position of each selected point according to its position and the updated adjustment displacement.

The cycle control unit 15 is used to control the cycle execution setting times of the evaluation index calculation unit 12, the adjustment displacement updating unit 13 and the position updating unit 14;

The evaluation index calculation unit 12 is also used to determine the current evaluation index corresponding to each selected point according to its current position, the target position of the aerocraft and the position of the obstacle in the selected area after the cycle control unit 15 controls the execution of the setting times.

The waypoint determination unit 16 is used to select the position with the best evaluation index as the next waypoint of the aerocraft among the current positions and global optimal position of all the selected points.

In the specific application, each unit can implement the corresponding function according to the specific steps of the above method.

In addition to providing the aforementioned cooperative path planning method and device for the automatic control aerocraft, the embodiment of the specification also provides a readable storage medium and an aerocraft system.

The program code is stored in the readable storage medium. After being loaded by the processor, the program code can be used to implement the cooperative path planning method of the automatic control aerocraft as described above.

As shown in FIG. 1, the aerocraft system includes an obstacle detection sensor 01, a memory 02, a power unit 03, and a first processor 04. The obstacle detection sensor 01 is used to detect at least the obstacle positions in the selected area; the memory 02 is used to store the program code and target position; the power device 03 is used to drive the flight and steering of the aerocraft; The first processor is used to load the program code and target position stored in the memory 02, and execute the cooperative path planning method of the automatic control aerocraft according to the obstacle positions detected by the obstacle detection sensor 01, so as to determine the next waypoint of the aerocraft.

The above is only a better specific embodiment of the disclosure, but the protection scope of the disclosure is not limited to this. Any change or replacement that can be easily thought of by any technical personnel familiar with the technical field within the technical scope disclosed by the disclosure shall be included in the protection scope of the disclosure.

The foregoing descriptions of specific exemplary embodiments of the present application have been presented for purposes of illustration and description. They are not intended to be exhaustive or to limit the application to the precise forms disclosed, and obviously many modifications and variations are possible in light of the above teachings. The exemplary embodiments were chosen and described in order to explain certain principles of the application and their practical application, to thereby enable others skilled in the art to make and utilize various exemplary embodiments of the present application, as well as various alternatives and modifications thereof. It is intended that the scope of the application be defined by the Claims appended hereto and their equivalents.

What is claimed is:

1. A cooperative path planning method of automatic control aerocraft system, wherein the automatic control aerocraft system has an obstacle detection sensor, a memory, a power device and a processor for implementing the following steps of the method, the method comprising:
step S101: in selected area, initializing randomly current position and adjustment displacement of each of a plurality of selected points;
step S102: determining current evaluation index of each of the selected points according to its current position, a target position of the aerocraft system which is stored in the memory and a position of an obstacle which is detected by the obstacle detection sensor in the selected area;
step S103: updating the adjustment displacement of a first selected point in the selected points according to its adjustment displacement, current position, historical optimal position and global optimal position; wherein the historical optimal position of the first selected point is determined according to the current evaluation index and optimal evaluation index corresponding to a historical position, and the global optimal position is the position with the best evaluation index among the historical optimal positions of all the selected points;
step S104: calculating a temporary position according to the current position of the first selected point and its updated adjustment displacement, and updating the current position of the first selected point with the temporary position when the temporary position is located in the selected area;
repeating the steps S102-S104
determining the current evaluation index corresponding to each of the selected points again according to its current position, the target position of the aerocraft system and the position of the obstacles in the selected area, and then executing step S105;
step S105: selecting the position corresponding to the optimal evaluation index as a next waypoint of the aerocraft system among the current positions of all the selected points and the global optimal position, so that the aerocraft system is driven by the power device to flight along a path toward the next waypoint;
wherein the selected area is determined by the following steps:
determining an obstacle area within a sphere area or parts of the sphere area with a position of the aerocraft system as a center of the sphere and a first length as a radius of the sphere;
determining a projected area of the obstacle area on a surface of the sphere or a spherical crown surface corresponding to the parts of sphere;
determining a set length according to the projected area and the first length;
setting a sphere range or parts of the sphere range as the selected area, wherein the aerocraft system position is a center of the sphere range and the set length is the radius of the sphere range.

2. The method according to claim 1, the step S103 comprises:
calculating self-learning displacement according to self-learning probability, the current position and the historical optimal position of the first selected point;
calculating global learning displacement according to global learning probability, the current position and the global optimal position of the first selected point;
updating the adjustment displacement of the first selected point according to its adjustment displacement, self-learning displacement and global learning displacement, wherein the sum of the self-learning probability and the global learning probability is 1.

3. The method according to claim 2, wherein
initializing randomly the self-learning probability when the adjustment displacement is a first update;
when the adjustment displacement is not the first update, obtaining the self-learning probability comprising the following steps:
selecting randomly a second selected point from the selected points;
keeping the self-learning probability of the first selected point unchanged when the evaluation index corresponding to the historical optimal position of the second selected point is less than or equal to the evaluation index corresponding to the historical optimal position of the first selected point;
updating the self-learning probability corresponding to the first selected point according to its learning coefficient, the self-learning probability of the second selected point and the self-learning probability of the first selected point when the evaluation index corresponding to the historical optimal position of the second selected point is larger than the evaluation index corresponding to the historical optimal position of the first selected point.

4. The method according to claim 3, updating the self-learning probability of the first selected point according to its learning coefficient, the self-learning probability of the second selected point and the self-learning probability of the first selected point comprising:
calculating probability difference between the self-learning probability of the second selected point and the self-learning probability of the first selected point;
calculating probability adjustment value according to the probability difference and the learning coefficient; and
updating the self-learning probability corresponding to the first selected point according to its self-learning probability and the probability adjustment value.

5. The method according to claim 1, wherein the steps for determining the selected area comprise:
excluding the sphere range or parts of the sphere range determined by taking the aerocraft system position as the sphere center and a third length as the radius from the selected area, when a position deviation of multiple waypoints continuously passed by the aerocraft system is less than a set deviation;
the third length is less than the set length.

6. The method according to claim 1, determining the current evaluation index corresponding to each of the selected points according to its current position, the target position of the aerocraft system and the position of the obstacles in the selected area comprising:

calculating first distance from the aerocraft system position to each of the selected points, second distance from the aerocraft system position to the target position, and third distance from each of the selected points to the target position;

calculating distance index according to the first distance, the second distance and the third distance; and determining possible straight line path according to the aerocraft system position and each of the selected points;

calculating collision index according to the straight line path and the position of the obstacles;

calculating the current evaluation index according to the distance index and the collision index.

7. The method according to claim 6, wherein the obstacles comprise fixed obstacles and moving obstacles;

calculating collision index according to the straight line path and the position of the obstacles comprises:

calculating static collision index according to the endpoints on the straight line path and the position of each fixed obstacle; and/or, calculating corresponding interval distance according to the endpoints on the straight line path and the position of each moving obstacle;

calculating dynamic collision index according to each interval distance and safety distance;

calculating the collision index according to the static collision index and the dynamic collision index.

8. The method according to claim 6, wherein calculating the current evaluation index according to the position of each of the selected points also comprising:

calculating possible course according to the current position of the aerocraft system and the position of each of the selected points;

calculating course deviation according to the current course and the possible course of the aerocraft system;

calculating steering index according to the course deviation and the maximum steering rate of the aerocraft system;

calculating the evaluation index according to the distance index and the collision index comprising:

calculating the evaluation index according to the distance index, the collision index and the steering index.

9. A cooperative path planning device of automatic control aerocraft, comprising: a first processor, a second processor, a third processor, a fourth processor, a fifth processor and a sixth processor, wherein in selected area, the first processor initializes randomly current position and adjustment displacement of each of the selected points;

the second processor determines current evaluation index of each of the selected points according to its current position, a target position of the aerocraft which is stored in a memory and a position of an obstacle in the selected area which is detected by an obstacle detection sensor;

the third processor updates the adjustment displacement of a first selected point in the selected points according to its adjustment displacement, the current position, historical optimal position and global optimal position; wherein the historical optimal position of the first selected point is determined according to the current evaluation index and optimal evaluation index corresponding to a historical position; and the global optimal position is the position with the best evaluation index among the historical optimal positions of all the selected points;

the fourth processor calculates temporary position according to the current position of the first selected point and its updated adjustment displacement, and updates the current position of the first selected point with the temporary position when the temporary position is located in the selected area;

the fifth processor determines the current evaluation index corresponding to each of the selected points again according to its current position, the target position of the aerocraft and the position of the obstacles in the selected area;

the sixth processor selects the position corresponding to the optimal evaluation index as a next waypoint of the aerocraft among the current positions of all the selected points and the global optimal position, so that the aerocraft is driven by a power device to flight toward the next waypoint along a set of waypoints that includes the next waypoint;

wherein the selected area is determined by the following steps:

determining obstacle area within sphere area or the parts of sphere area with the aerocraft position as the sphere center and a first length as the radius, and determining projected area of the obstacle area on spherical surface or spherical crown surface corresponding to the parts of sphere;

determining set length according to the projected area and the first length;

setting sphere range or parts of sphere range with the aerocraft position as the sphere center and the set length as the radius as the selected area.

10. The device according to claim 9, the third processor comprises: a first subprocessor, a second subprocessor, and a third subprocessor, wherein the first subprocessor calculates self-learning displacement according to self-learning probability, the current position and the historical optimal position of the first selected point;

the second subprocessor calculates global learning displacement according to global learning probability, the current position and the global optimal position of the first selected point;

the third subprocessor updates the adjustment displacement of the first selected point according to its adjustment displacement, self-learning displacement and global learning displacement, wherein the sum of the self-learning probability and the global learning probability is 1.

11. The device according to claim 10, wherein initializing randomly the self-learning probability when the adjustment displacement is a first update;

when the adjustment displacement is not the first update, obtaining the self-learning probability comprising:

selecting randomly a second selected point from the selected points;

keeping the self-learning probability of the first selected point unchanged when the evaluation index corresponding to the historical optimal position of the second selected point is less than or equal to the evaluation index corresponding to the historical optimal position of the first selected point;

updating the self-learning probability corresponding to the first selected point according to its learning coefficient, the self-learning probability of the second selected point and the self-learning probability of the first selected point when the evaluation index corresponding to the historical optimal position of the second selected point is larger than the evaluation index corresponding to the historical optimal position of the first selected point.

12. The device according to claim 11, updating the self-learning probability of the first selected point according to its learning coefficient, the self-learning probability of the second selected point and the self-learning probability of the first selected point comprising:
 calculating probability difference between the self-learning probability of the second selected point and the self-learning probability of the first selected point;
 calculating probability adjustment value according to the probability difference and the learning coefficient; and
 updating the self-learning probability corresponding to the first selected point according to its self-learning probability and the probability adjustment value.

13. The device according to claim 9, wherein the determining the selected area comprise:
 excluding the sphere range or parts of sphere range determined by taking the aerocraft position as the sphere center and a third length as the radius from the selected area, when a position deviation of multiple waypoints continuously passed by the aerocraft is less than a set deviation;
 the third length is less than the set length.

14. The device according to claim 9, the second processor is further configured for:
 calculating first distance from the aerocraft position to each of the selected points, second distance from the aerocraft position to the target position, and third distance from each of the selected points to the target position;
 calculating distance index according to the first distance, the second distance and the third distance; and
 determining possible straight line path according to the aerocraft position and the each of the selected points;
 calculating collision index according to the straight line path and the position of the obstacles;
 calculating the current evaluation index according to the distance index and the collision index.

15. The device according to claim 14, wherein the obstacles comprise fixed obstacles and moving obstacles;
 calculating collision index according to the straight line path and the position of the obstacles comprises:
  calculating static collision index according to the endpoints on the straight line path and the position of each fixed obstacle; and/or,
  calculating corresponding interval distance according to the endpoints on the straight line path and the position of each moving obstacle;
  calculating dynamic collision index according to each interval distance and safety distance;
  calculating the collision index according to the static collision index and the dynamic collision index.

16. The device according to claim 14, wherein calculating the current evaluation index according to the position of each of the selected points also comprising:
 calculating possible course according to the current position of the aerocraft and the position of each of the selected points;
 calculating course deviation according to the current course and the possible course of the aerocraft;
 calculating steering index according to the course deviation and the maximum steering rate of the aerocraft;
 calculating evaluation index according to the distance index and the collision index comprising:
 calculating the evaluation index according to the distance index, the collision index and the steering index.

* * * * *